April 7, 1931. R. D. PIKE 1,799,479
PROCESS FOR MAKING POTASSIUM PHOSPHATE
Filed June 18, 1928
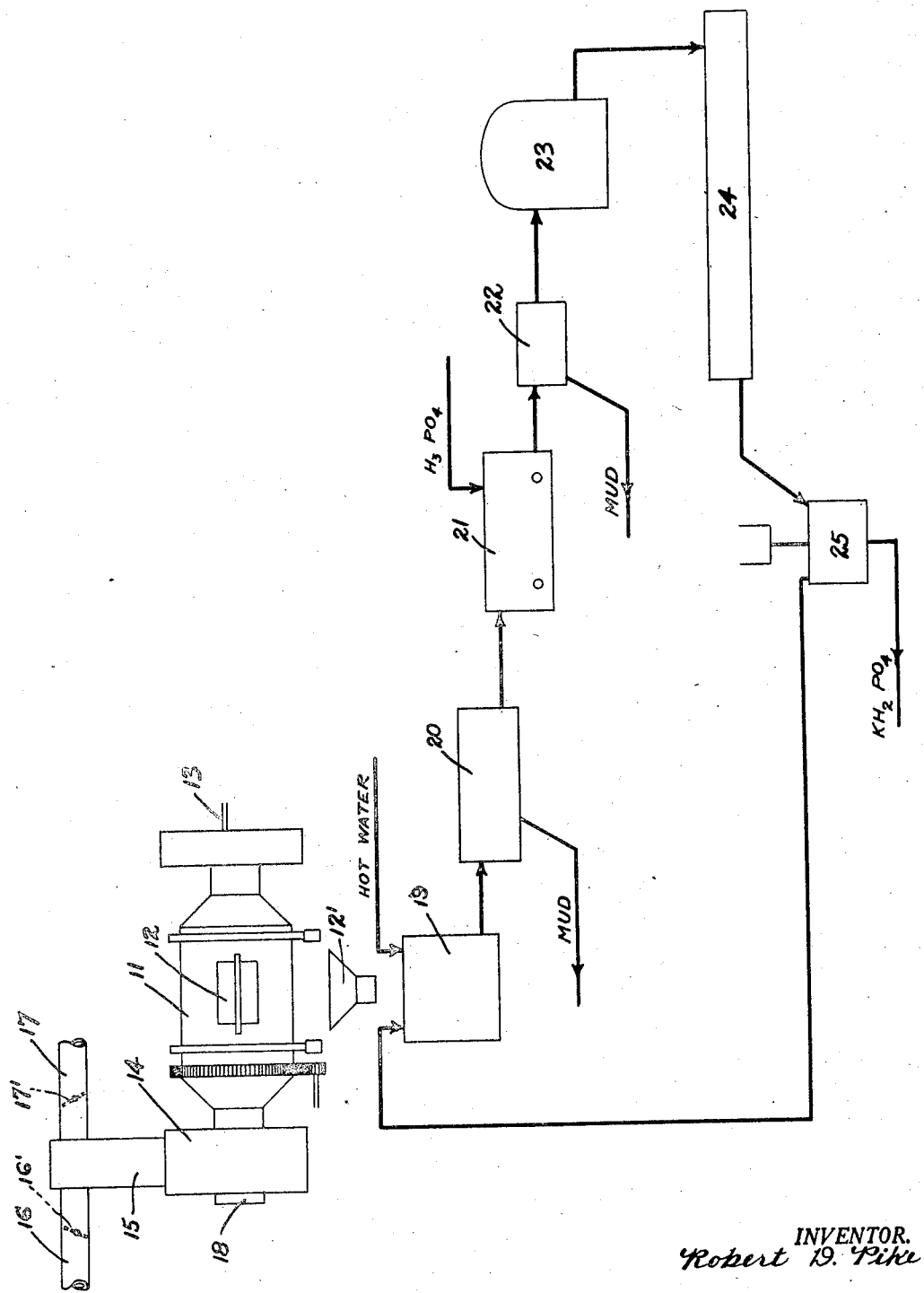
INVENTOR.
Robert D. Pike.
BY Townsend, Loftus & Abbott
ATTORNEYS.

Patented Apr. 7, 1931

1,799,479

UNITED STATES PATENT OFFICE

ROBERT D. PIKE, OF PIEDMONT, CALIFORNIA

PROCESS FOR MAKING POTASSIUM PHOSPHATE

Application filed June 18, 1928. Serial No. 286,082.

My present invention relates to a process for converting potassium chloride into commercially pure mono-potassium phosphate. The latter salt is non-hygroscopic, chemically stable, has a slight acid reaction and when pure contains 86.7% water soluble plant food, and is one of the most valuable of the concentrated chemical plant foods.

An object of my invention is to provide a process for producing potassium phosphate by the combination of potassium chloride and phosphoric acid which will contain a larger amount of available plant food than any similar product heretofore produced.

In a co-pending application Serial Number 233,326, filed November 14, 1927, I describe a process in which potassium chloride and phosphoric acid are combined and produce a mixed phosphate of lime and potassium, containing 55% to 73% available plant food. The product of my present invention distinguishes over the product produced by the process outlined in the above application in that my present product has no lime and contains from 80% to 84% available plant food.

A nominal reaction between potassium chloride and phosphoric acid for production of mono-potassium phosphate may be written thus:

$$KCl + H_3PO_4 \rightarrow KH_2PO_4 + HCl \quad (1)$$

But if the reactants of this equation in the proportions indicated be mixed, it is found that furnace heat is necessary to drive off all the hydrochloric acid and the same heat also dehydrates the mono-potassium phosphate to potassium meta phosphate thus:

$$KH_2PO_4 \rightarrow KPO_3 + H_2O \quad (2)$$

The furnace product is sticky, unmanageable and almost insoluble in water.

If reaction (1) is modified by only adding enough phosphoric acid to form tri-potassium phosphate and subjected to furnace heat, I have found that tri-potassium phosphate is not formed and, even when the charge is fused, only about one-third of the hydrochloric acid is driven off. Evidently potassium meta phosphate, $KPO_3$, is formed from one-third of the KCl and there is no further reaction between $KPO_3$ and KCl.

I have discovered that if I prepare a batch of potassium chloride, phosphoric acid and sulphuric acid and subject it in a suitable, well known furnace, preferably of the revolving type, to a temperature of 600° to 700° C. for from one-half hour to one hour, all of the hydrochloric acid will be driven off. In proportioning the batch, I use about 2.8 mols of K as KCl to one mol of P as $H_3PO_4$, the latter being in the form of crude concentrated phosphoric acid, and I assume that reaction (1) occurs between the KCl and the $H_3PO_4$ and that the $KH_2PO_4$ thus formed is dehydrated according to reaction (2). This leaves 1.8 mols of KCl unreacted, and the sulphuric acid portion of the batch is so proportioned as to completely react with the 1.8 mols of KCl to form $K_2SO_4$, thus:

$$2KCl + H_2SO_4 \rightarrow K_2SO_4 + 2HCl \quad (3)$$

The theoretical amount of $H_2SO_4$ is used.

Some latitude in proportioning the respective ingredients is permissible, but I have found that the proportions above stated give a satisfactory reaction.

For the purpose of facilitating an understanding of my invention I have shown schematically in the accompanying drawing the arrangement of apparatus contemplated by my invention. In this drawing, the various pieces of apparatus are merely outlined and the heavy lines extending therebetween illustrate the direction of flow of the material as it passes through the apparatus.

The further course of the reactions which I have discovered will best be understood by reference to the accompanying diagrammatic flow sheet. In following out the preliminary stage of the reaction already referred to, I place in a revolving furnace 11 having a lining of suitable acid-proof refractory material, a charge made up as follows:

| | Parts by weight |
|---|---|
| Commercial chloride of potassium containing 60% $K_2O$ | 220 |
| Commercial phosphoric acid containing 45% $P_2O_5$ as $H_3PO_4$ | 158 |
| Commercial 60° sulphuric acid | 114 |

The charge is placed in the furnace through a door 12, which is then secured in place, the furnace being revolved by suitable means and heat supplied by a gas burner 13. The other end of the furnace rotates in a housing 14 which communicates with a flue 15 having branches 16 and 17. HCl begins to be evolved from the charge almost immediately after the operation is started and is completely expelled in about one-half hour after reaching the temperature of 770° C. During this stage of the operation a damper 16' in flue 16 is closed and the flue 17 is left open to allow the HCl gas to pass to suitable absorbing apparatus, not shown. During the early part of the reaction, the charge becomes completely fluid and then passes into a semi-fluid condition, but does not become sticky. When tests indicate that the elimination of hydrochloric acid has proceeded to the point desired, the door 18 is opened and powdered coal or coke is charged into the furnace in proportions to give about .3 pound of fixed carbon to each pound of chloride of potash in the original charge. At the same time the damper 17' in flue 17 is closed and flue 16 is then opened, and the fire from burner 13 is increased so as to raise the temperature as rapidly as possible to about 850° C. Immediately a strong evolution of $SO_2$ commences which passes out through flue 16 and is properly disposed of. The charge in the furnace now becomes a very porous, semi-liquid mass which, however, does not stick to brickwork and is kept thoroughly agitated by the rotation of the furnace. When the temperature of 850° C. has been reached, it will be found that practically all of the sulphur has been eliminated and candle-like flames will be observed issuing from the porous charge. The fire is then shut off, and the mass forms into clinker, which is discharged through the door 12 and a hopper 12' into a tank 19.

As a result of the foregoing, it will be found that there has been a complete reaction in the clinker thus produced between the chloride of potash and the phosphoric acid and substantially all of the hydrochloric acid and sulphuric acid of the original charge has been eliminated. The clinker is extremely hygroscopic and becomes wet and mushy after a few hours' exposure to the atmosphere. It is an intermediate product of no practical value in itself, and I have not attempted to identify its precise chemical nature. However, it is very soluble in water and the next step is to digest it with hot water and returned mother liquor in the tank 19. This produces a solution of about 1.2 specific gravity. This solution is filtered in a filter 20. The mud from the filter 20 contains the ash of the fuel, which usually fixes some potash, some unconsumed carbon, and some $AlPO_4$. This mud may be treated further for the recovering of the $K_2O$ and $P_2O_5$ which it contains, but the quantity is small. The clear liquor goes to a tank 21 where crude phosphoric acid is added to it to produce mono-potassium phosphate in solution. The aluminum phosphate mud which is formed in the tank 21 is then filtered out in a filter 22 and the clear solution is evaporated in an evaporator 23 and subsequently crystallized in a crystallizer 24. Crystals of mono-potassium phosphate are removed in a separator 25 and the mother liquor is conducted back to the digestion tank 19.

It will be obvious that the contents of tank 21 can be run directly to dryness for the production of crude mono-potassium phosphate, in accordance with my process covered by co-pending application Serial Number 259,421.

While I have described a preferred embodiment of my invention as now known to me, it is to be understood that various changes may be made therein without departing from the spirit of the invention as defined in the appended claim.

Having thus described my invention, what I claim and desire to secure by Letters Patent is—

The process for making tri-potassium phosphate from potassium chloride and phosphoric acid in a single furnace operation which consists in furnacing a mixture of potassium chloride with sufficient phosphoric acid to make the tri-salt and sulphuric acid which is sufficient to drive off substantially all of the hydrochloric acid and adding a carbonaceous reducing agent to complete the conversion of the furnace contents to substantially a tri-basic potassium phosphate.

ROBERT D. PIKE.